(12) United States Patent
Pfnuer

(10) Patent No.: US 8,622,626 B2
(45) Date of Patent: Jan. 7, 2014

(54) FIBER OPTIC CONNECTORS

(75) Inventor: Stefan Martin Pfnuer, Redwood City, CA (US)

(73) Assignee: Finisar Corporation, Sunnyvale, CA (US)

( * ) Notice: Subject to any disclaimer, the term of this patent is extended or adjusted under 35 U.S.C. 154(b) by 219 days.

(21) Appl. No.: 13/165,653

(22) Filed: Jun. 21, 2011

(65) Prior Publication Data

US 2012/0155808 A1 Jun. 21, 2012

Related U.S. Application Data

(60) Provisional application No. 61/356,748, filed on Jun. 21, 2010.

(51) Int. Cl.
*G02B 6/38* (2006.01)
(52) U.S. Cl.
USPC .............................................. 385/72; 385/73
(58) Field of Classification Search
None
See application file for complete search history.

(56) References Cited

U.S. PATENT DOCUMENTS

| 5,887,095 A | 3/1999 | Nagase et al. |
| 2004/0247255 A1 | 12/2004 | Rosenburg et al. |
| 2011/0081116 A1* | 4/2011 | Nakagawa ...................... 385/78 |

FOREIGN PATENT DOCUMENTS

JP 2007-079422 3/2007

OTHER PUBLICATIONS

International Search Report & Written Opinion mailed Feb. 23, 2012 in related PCT application No. PCT/US2011/041297.

* cited by examiner

*Primary Examiner* — Jerry Rahll
(74) *Attorney, Agent, or Firm* — Maschoff Brennan

(57) ABSTRACT

Fiber optic connectors for use in connecting and aligning two optical fibers. In one example embodiment, a fiber optic connector includes a body, a cylindrical split sleeve at least partially positioned within the body, and a shell at least partially positioned within the body and surrounding the split sleeve. The body defines an internal port and an external port. The split sleeve defines a slot along the length of the split sleeve and has first and second open ends. The first end is configured to receive and grip a ferrule of an internal optical fiber and the second end is configured to receive and grip a ferrule of an external optical fiber. The portion of the shell surrounding the first end has a greater inside clearance than the portion of the shell surrounding the second end.

20 Claims, 17 Drawing Sheets

POWER CHANGE DURING SIDE LOAD TEST OF EXTERNAL OPTICAL FIBER
Power Change Shown In Db

| Standard Fiber Optic Connector Floating Split Sleeve | Standard Fiber Optic Connector Fixed Split Sleeve | New Fiber Optic Connector Split Sleeve |
|---|---|---|
| 0.52 | 1.03 | 0.08 |
| 0.61 | 1.04 | 0.11 |
| 0.74 | 1.07 | 0.13 |
| 0.87 | 1.14 | 0.14 |
| 1.06 | 1.21 | 0.14 |
| 1.51 | 1.32 | 0.15 |
| 1.72 | 1.4 | 0.16 |
| 2.2 | 1.51 | 0.18 |
| | 1.59 | 0.2 |
| | 1.66 | 0.4 |
| | 1.75 | 0.67 |
| | 1.82 | |
| | 1.84 | |
| | 1.86 | |
| | 1.96 | |
| | 2.0 | |

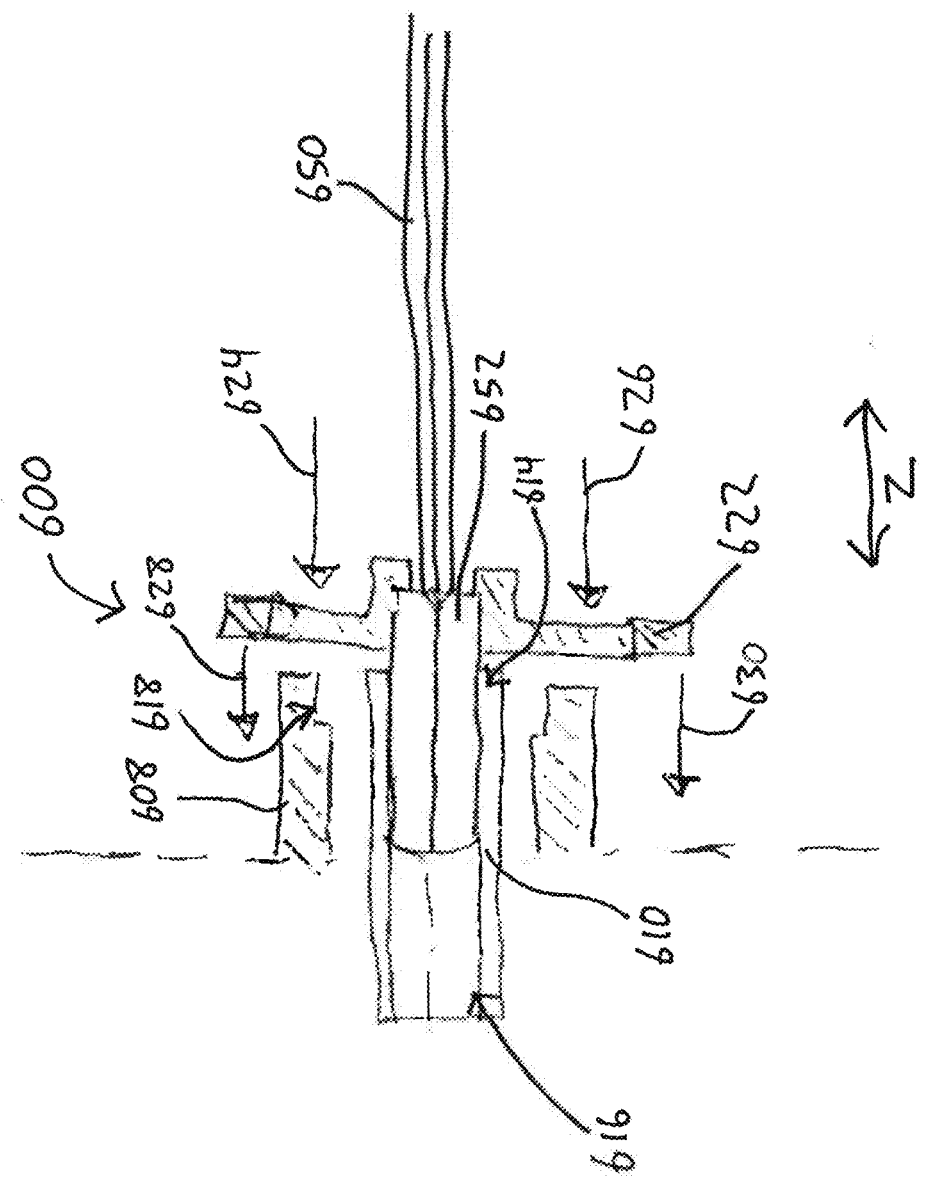

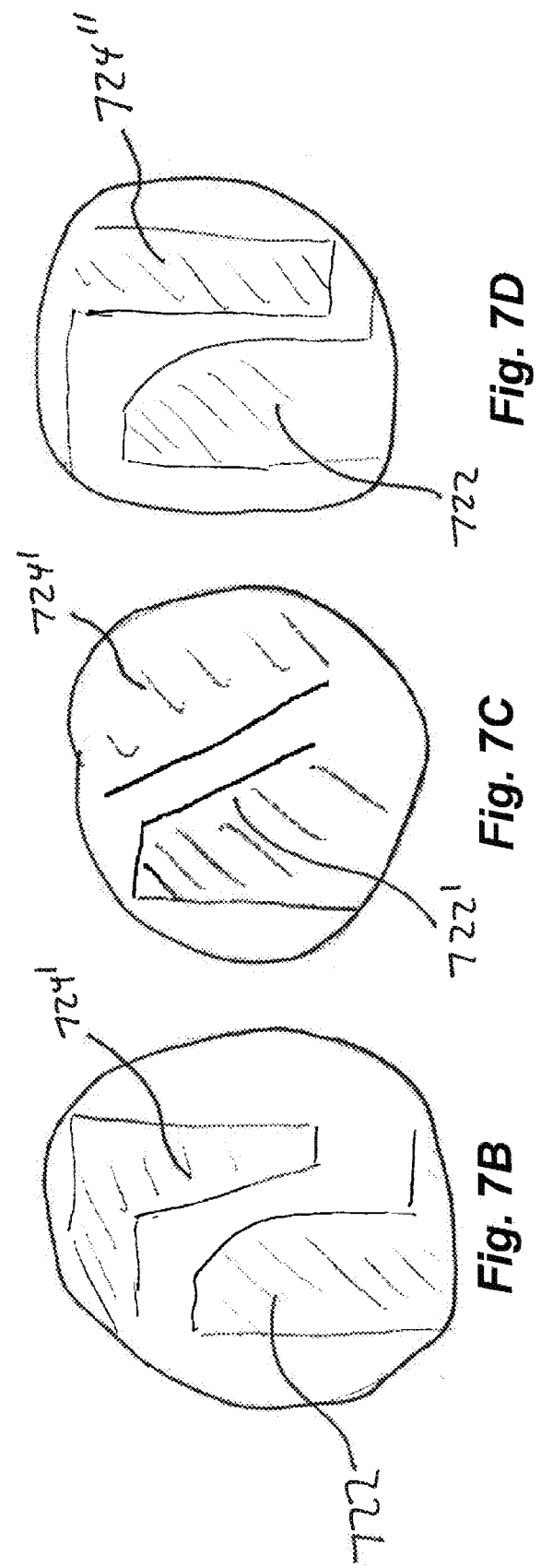

FIBER OPTIC CONNECTORS

CROSS REFERENCE TO A RELATED APPLICATION

This application claims priority to and the benefit of U.S. Provisional Patent Application Ser. No. 61/356,748, entitled FIBER OPTIC CONNECTOR WITH STABLE ALIGNMENT, which was filed on Jun. 21, 2010, and is hereby incorporated by reference in its entirety.

BACKGROUND

A fiber optic connector enables two optical fibers to be connected to one another so that an optical signal can travel between the two optical fibers. For example, an optoelectronic device may include a fiber optic connector with internal and external ports. The internal port can be configured to receive an internal optical fiber that connects to internal optical or optoelectronic components of the optoelectronic device. The external port can be configured to receive an external optical fiber that connects the optoelectronic device to a distant optoelectronic device.

The characteristics of the internal and external ports of a fiber optic connector of an optoelectronic device are typically dictated by an industry standard for the particular fiber optic connector type. Some example industry standards are the TIA/EIA 604-3a and FOCIS standards. One characteristic that is specified in various industry standards is the allowable optical power change while a side load (also known as side pull) is applied to the external optical fiber. During a side load, a strain is placed on the external optical fiber, which can result in the external optical fiber and the internal optical fiber becoming misaligned. Another characteristic that can be specified is the allowable optical power change while the fiber optic connector is agitated. For example, the external optical fiber may be plugged into a horizontally positioned fiber optic connector and a defined weight may be applied to the external optical fiber. Then the whole fiber optic connector can be rotated 360 degrees back and forth along its longitudinal axis, which can result in the external optical fiber and the internal optical fiber becoming misaligned.

Thus, there is a need for fiber optic connectors designed to handle a side load and agitation without misalignment between the external and internal optical fibers.

BRIEF SUMMARY OF SOME EXAMPLE EMBODIMENTS

In general, example embodiments relate to fiber optic connectors for use in connecting and aligning two optical fibers. The example fiber optic connectors disclosed herein can be employed in connection with an optoelectronic device, such as an optoelectronic transceiver. The example fiber optic connectors disclosed herein maintain a stable alignment between an internal optical fiber plugged into an internal port and an external optical fiber plugged into an external port, even where a side load is applied to the external optical fiber or the example fiber optic connector is agitated.

In one example embodiment, a fiber optic connector includes a body, a cylindrical split sleeve at least partially positioned within the body, and a shell at least partially positioned within the body and surrounding the split sleeve. The body defines an internal port and an external port. The split sleeve defines a slot along the length of the split sleeve and has first and second open ends. The first end is configured to receive and grip a ferrule of an internal optical fiber and the second end is configured to receive and grip a ferrule of an external optical fiber. The portion of the shell surrounding the first end has a greater inside clearance than the portion of the shell surrounding the second end.

In another example embodiment, a fiber optic connector includes a body, a cylindrical split sleeve at least partially positioned within the body, and two or more shells at least partially positioned within the body and surrounding the split sleeve. The body defines an internal port and an external port. The split sleeve defines a slot along the length of the split sleeve and has first and second open ends. The first end is configured to receive and grip a ferrule of an internal optical fiber and the second end is configured to receive and grip a ferrule of an external optical fiber. The portion of the two or more shells surrounding the first end having a greater inside clearance than the portion of the two or more shells surrounding the second end.

These and other aspects of example embodiments of the invention will become more fully apparent from the following description and appended claims.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which:

FIG. 1F is a chart comparing the results of various side load tests on prior art connectors and on the connector of FIG. 1A;

FIG. 6 is a cross-sectional side view of a portion of a sixth example fiber optic connector;

FIGS. 7B-7D are alternative cross-sectional side views of a portion of the connector of FIG. 7A.

DETAILED DESCRIPTION OF SOME EXAMPLE EMBODIMENTS

Example embodiments of the invention relate to fiber optic connectors for use in connecting and aligning two optical fibers. The example fiber optic connectors disclosed herein can be employed in connection with an optoelectronic device, such as an optoelectronic transceiver. The example fiber optic connectors disclosed herein maintain a stable alignment between an internal optical fiber plugged into an internal port and an external optical fiber plugged into an external port, even where a side load is applied to the external optical fiber or the example fiber optic connector is agitated.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. First Example Fiber Optic Connector

Reference is first made to FIGS. 1A-1F which disclose aspects of a first example fiber optic connector 100. The connector 100 is an SC connector and is configured to be integrated into an optoelectronic device, such as an optoelectronic transceiver module (not shown).

The optoelectronic transceiver module can be configured for optical signal transmission and reception at a variety of per-second data rates including, but not limited to, 1 Gbit, 2 Gbit, 2.5 Gbit, 4 Gbit, 8 Gbit, 10 Gbit, 14 Gbit, 16 Gbit, 40 Gbit, 100 Gbit, 120 Gbit, or higher. Furthermore, the optoelectronic transceiver module can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic transceiver module can be configured to support various transmission standards including, but not limited to, Optical Fast Ethernet, Optical Gigabit Ethernet, 10 Gigabit Ethernet, 40G Ethernet, 100G Ethernet, and 1x, 2x, 4x, 8x, 10x, and 16x Fibre Channel. In addition, the optoelectronic transceiver module can be configured to have a form factor that is substantially compliant with any of a variety of standards such as the SFP+ MSA, the SFF MSA, the SFP MSA, the CFP MSA, or the CXP MSA.

Figure 1A:
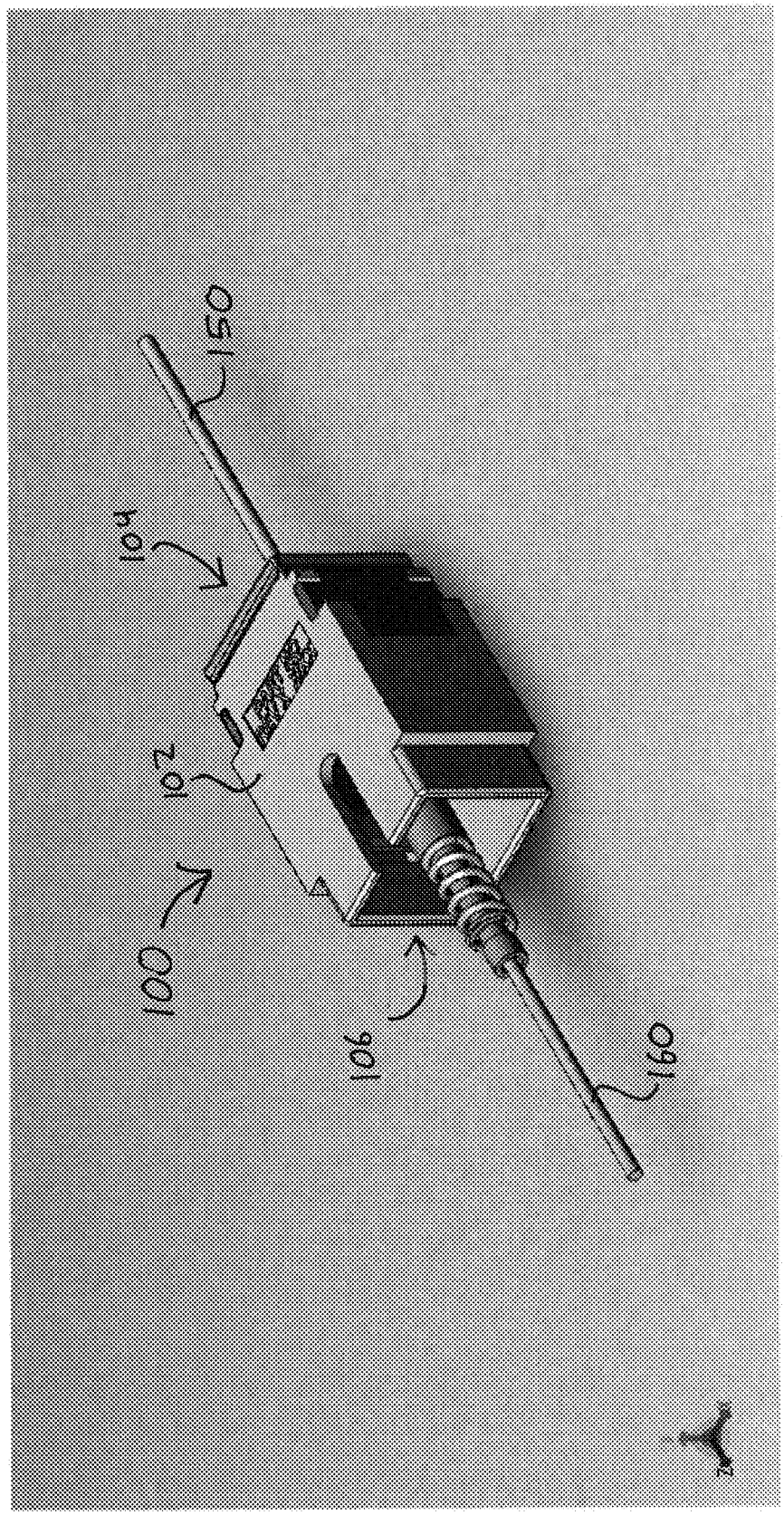
FIG. 1A is a perspective view of a first example fiber optic connector.

As disclosed in FIG. 1A, the connector 100 includes a body 102 which defines an internal port 104 and an external port 106. An internal optical fiber is 150 is plugged into the internal port 104 and an external optical fiber 160 is received in the external port 106. Once assembled into an optoelectronic transceiver module (not shown), for example, the internal port 104 and internal optical fiber 150 will be enclosed within a housing of the optoelectronic transceiver module, while the external port 106 and external optical fiber 160 will be positioned outside the housing of the optoelectronic transceiver module.

Figure 1B:
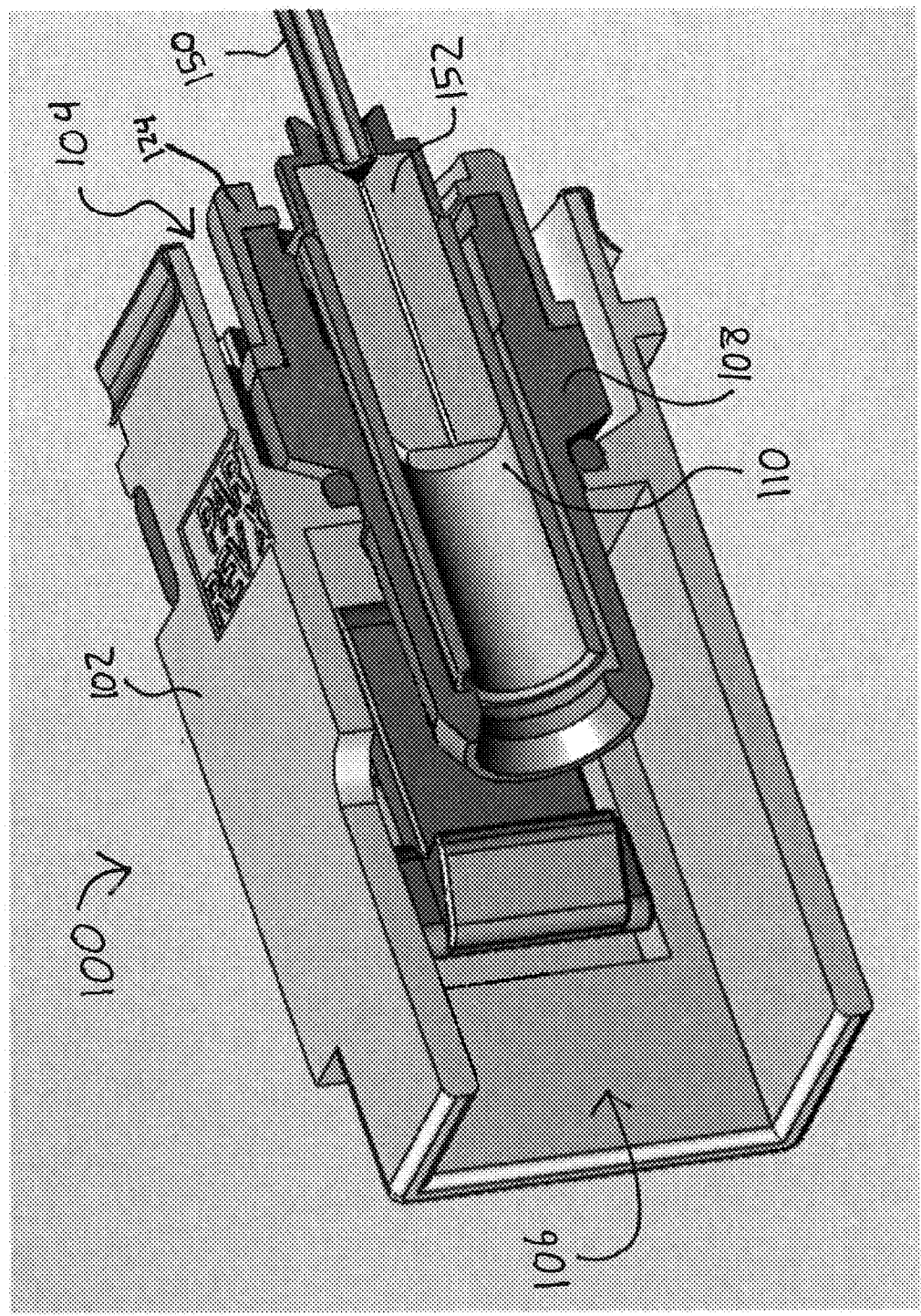
FIG. 1B is a cross-sectional perspective view of the connector of FIG. 1A.
Figure 1C:
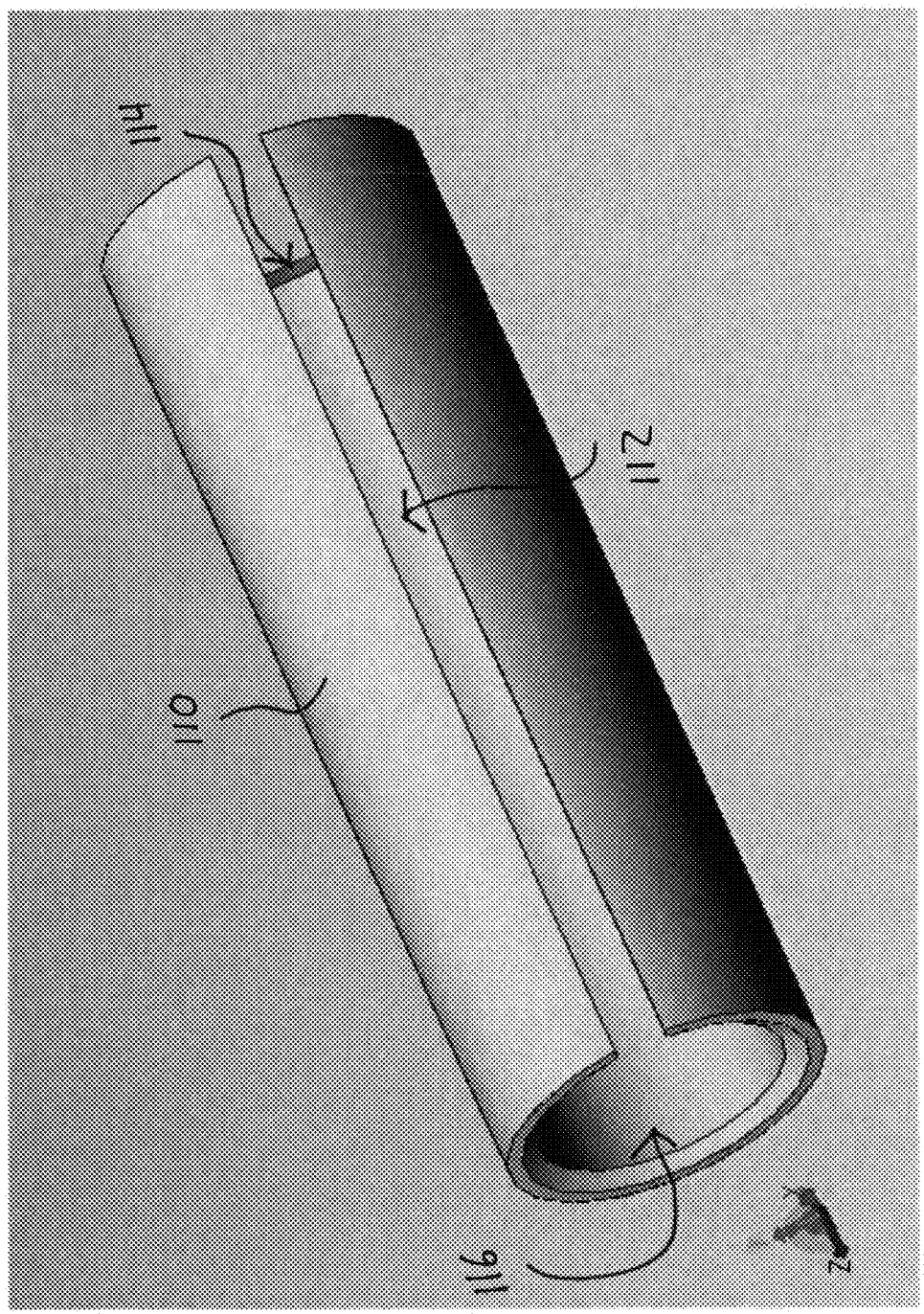
FIG. 1C is a perspective view of a split sleeve of the connector of FIG. 1A.

As disclosed in FIG. 1B, the connector 100 also includes a shell 108 that surrounds a cylindrical split sleeve 110, both of which are at least partially positioned within the body 102. As disclosed in FIG. 1C, the split sleeve 110 defines a slot 112 along the entire length of the split sleeve 110. As disclosed in FIGS. 1B and 1C, the slot 112 allows the inside diameter of the split sleeve 110 to be slightly smaller than the outside diameter of a ferrule 152 of the internal optical fiber 150 so that the ferrule 152 is gripped firmly by a first open end 114 of the split sleeve 110. As disclosed in FIGS. 1C and 1D, it is understood that a second open end 116 of the split sleeve 110 is also configured to similarly firmly grip a ferrule 162 of the external optical fiber 160 so as to align the internal and external optical fibers 150 and 160.

Figure 1D:
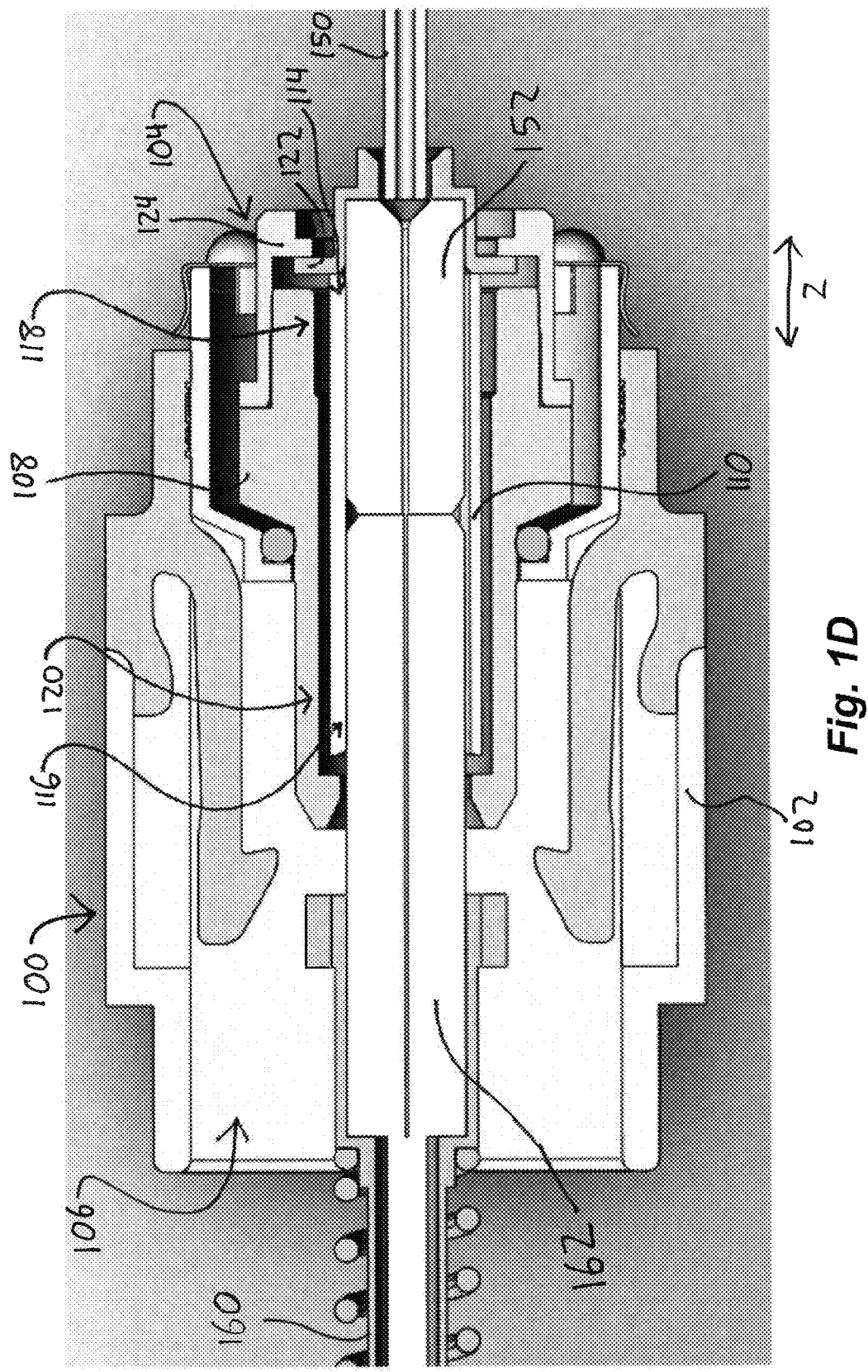
FIG. 1D is a cross-sectional side view of the connector of FIG. 1A.

Also disclosed in FIG. 1D, the portion 118 of the shell 108 that surrounds the first end 114 of the split sleeve 110 has a greater inside clearance than the portion 120 of the shell 108 that surrounds the second end 116 of the split sleeve 110. This greater inside clearance of the portion 118 of the shell 108 enables the first end 114 of the split sleeve 110 to shift/float/tilt when a side load is applied to the external optical fiber 160 or the fiber optic connector 100 is agitated. In addition, a flange 122 attached to the ferrule 152 of the optical fiber 150, in cooperation with a ring 124, allows the first end 114 of the split sleeve 110 to shift/float/tilt within the portion 118 of the shell 108 while maintaining the split sleeve 110 within the body 102 of the fiber optic connector 100.

Enabling the first end 114 of the split sleeve 110 to shift/float/tilt during a side load or agitation allows the split sleeve 110 to maintain a stable alignment between the internal optical fiber 150 and the external optical fiber 160. This stable alignment contributes to low levels of power change when a side load is applied to the external optical fiber 160 or the example fiber optic connector 100 is agitated, as discussed below in connection with FIG. 1F.

Figure 1E:
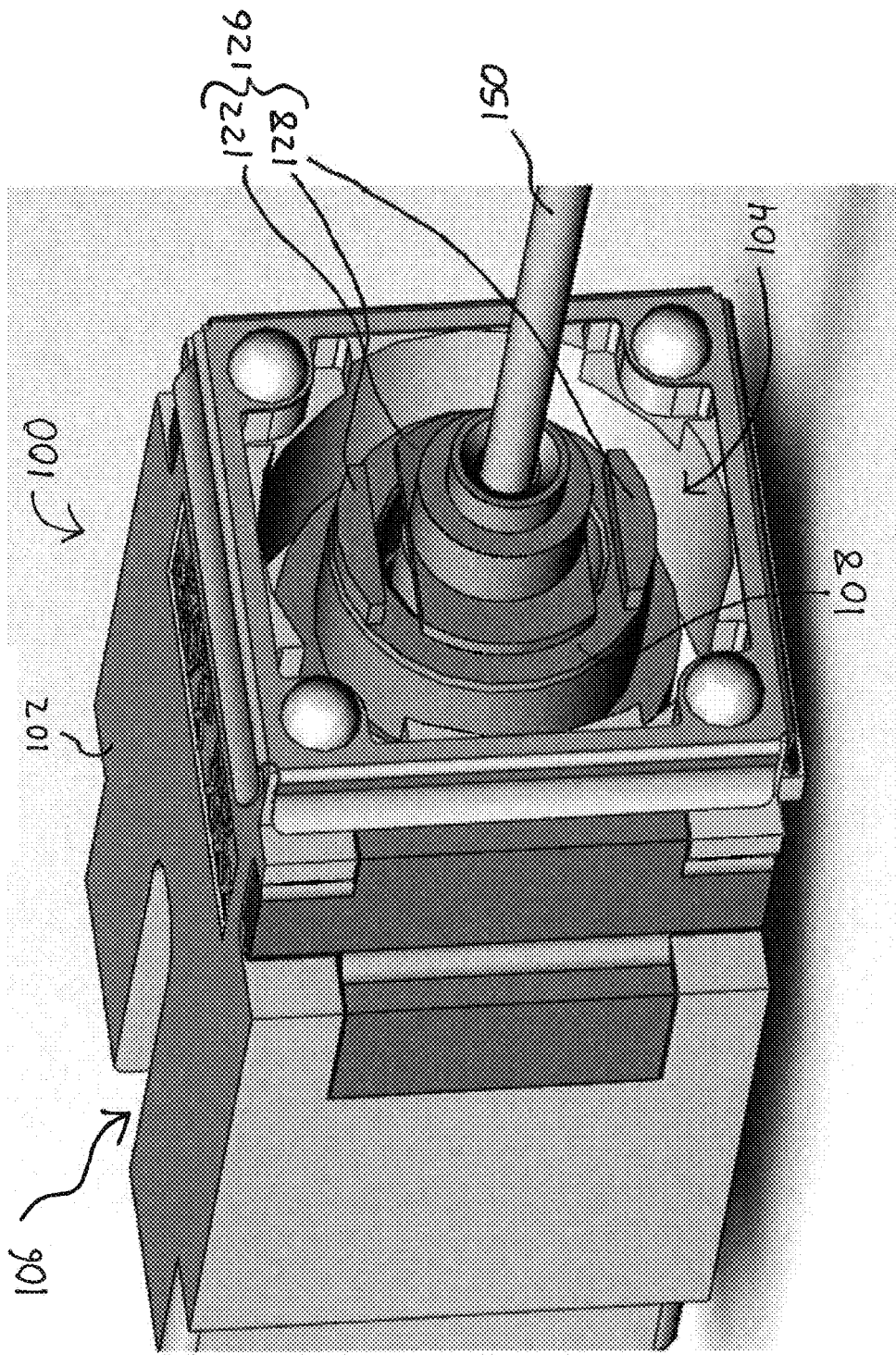
FIG. 1E is a perspective rear view of the connector of FIG. 1A.

As disclosed in FIGS. 1D and 1E, the connector 100 also includes a keyed feature 126. The keyed feature 126 includes the flange 122 and protrusions 128 from the shell 108. Although the ring 124 has been removed from FIG. 1E to expose aspects of the keyed feature 126, it is understood that the ring 124 contributes to the functionality of the keyed feature 126. The keyed feature 126 prevents rotation of the ferrule 152 of the internal optical fiber 150, thus preventing damage to the internal optical fiber 150. The keyed feature 126 also allows the first end 114 of the split sleeve 110 to shift/float/tilt when a side load is applied to the external optical fiber 160 or the connector 100 is agitated. It is understood that various other keyed features could be used. For example, a slot in the flange 122 can interact with pins attached to the shell 108 or other fixed part of the connector 100. Alternatively, a rectangle or elliptic shaped flange can interact with a negative imprint of the flange on the shell 108 or other fixed part of the connector 100.

FIG. 1F discloses a chart 170 with the results of various side load tests. As disclosed in the chart 170, side load tests on a standard fiber optic connector with a fixed split sleeve resulted in between 1.03 dB and 2.0 dB of power change in the standard fiber optic connector. Side load tests on a standard fiber optic connector with a floating split sleeve resulted in between 0.52 dB and 2.2 dB of power change in the standard fiber optic connector. In contrast, side load tests on the example fiber optic connector 100 with the shell 108 and the split sleeve 110 resulted in only between 0.08 dB and 0.67 dB of power change in the connector 100. Therefore, the improved design of the shell 108 contributes to low levels of power change when a side load is applied to the external optical fiber 160 (see FIGS. 1A and 1D).

2. Second Example Fiber Optic Connector

Reference is now made to FIGS. 2A-2D which disclose a second example fiber optic connector 200. The connector 200 is an LC connector and is configured to be integrated into an optoelectronic device, such as an optoelectronic transceiver module having any of the characteristics discussed above in connection with FIGS. 1A-1F.

Figure 2A:
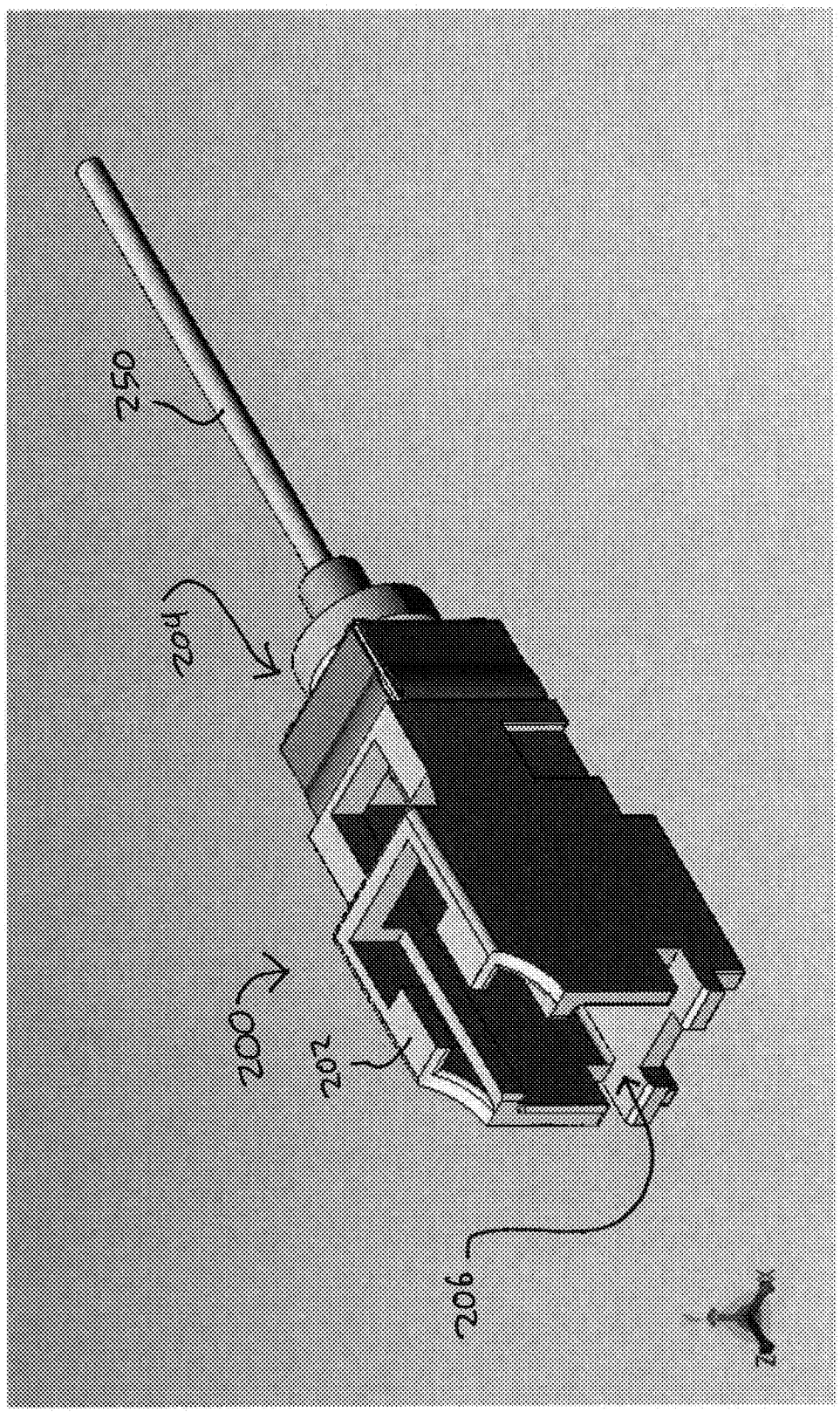
FIG. 2A is a perspective view of a second example fiber optic connector.

As disclosed in FIG. 2A, the connector 200 includes a body 202 which defines an internal port 204 and an external port 206. An internal optical fiber is 250 is plugged into the internal port 204 and an external optical fiber (not shown) can be received in the external port 206. Once assembled into an optoelectronic transceiver module, for example, the internal port 204 and internal optical fiber 250 will be enclosed within a housing of the optoelectronic transceiver module, while the external port 206 and the external optical fiber (not shown) received therein will be positioned outside the housing of the optoelectronic transceiver module.

Figure 2B:
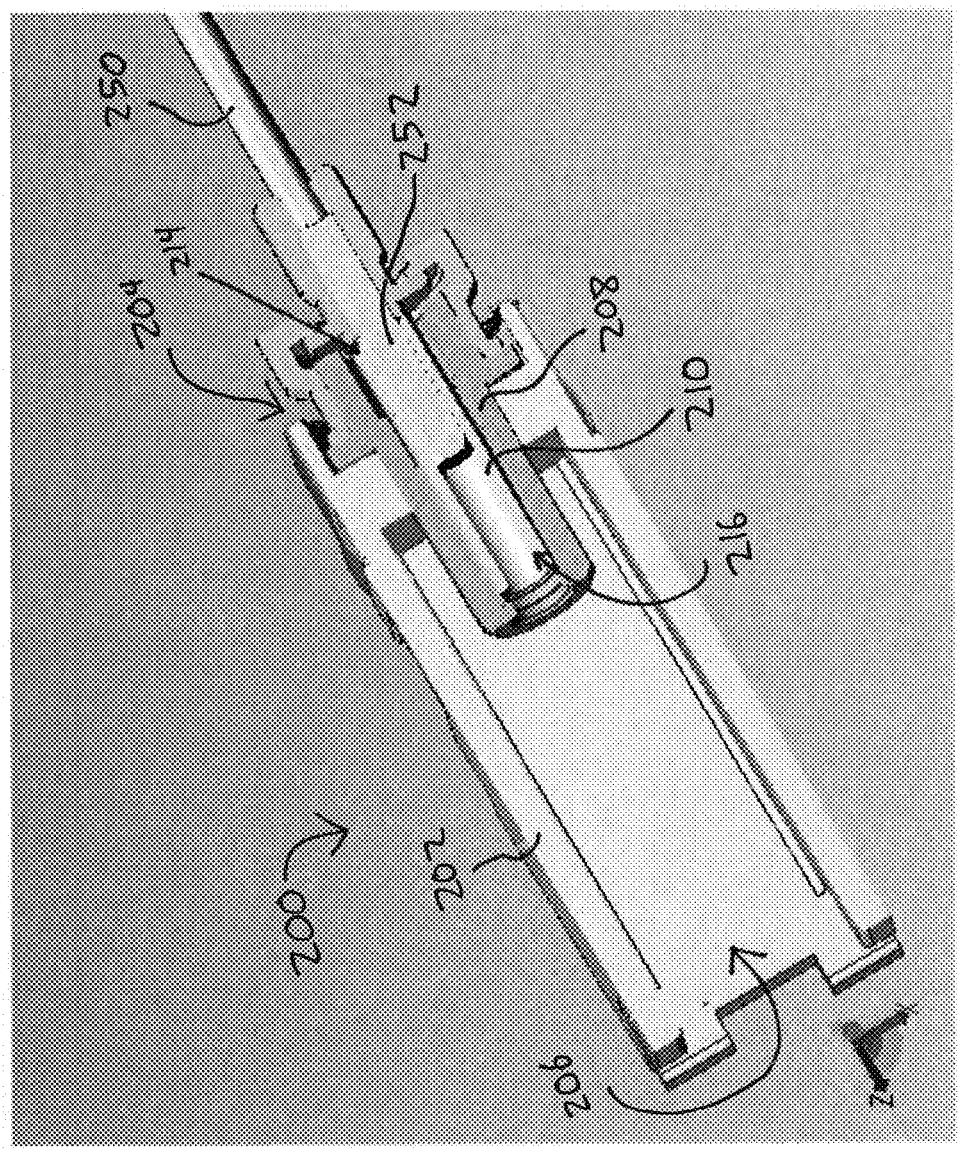
FIG. 2B is a cross-sectional perspective view of the connector of FIG. 2A.

As disclosed in FIG. 2B, the connector 200 includes a shell 208 that surrounds a cylindrical split sleeve 210, both of which are at least partially positioned within the body 202. The split sleeve 210 defines a slot (not shown) along the entire length of the split sleeve 210. As disclosed in FIGS. 2B and 2C, a first open end 214 of the split sleeve 210 firmly grips a ferrule 252 of the internal optical fiber 250, while a second open end 216 of the split sleeve 210 is configured to firmly grip a ferrule of the external optical fiber (not shown) so as to align the internal and external optical fibers.

Figure 2C:
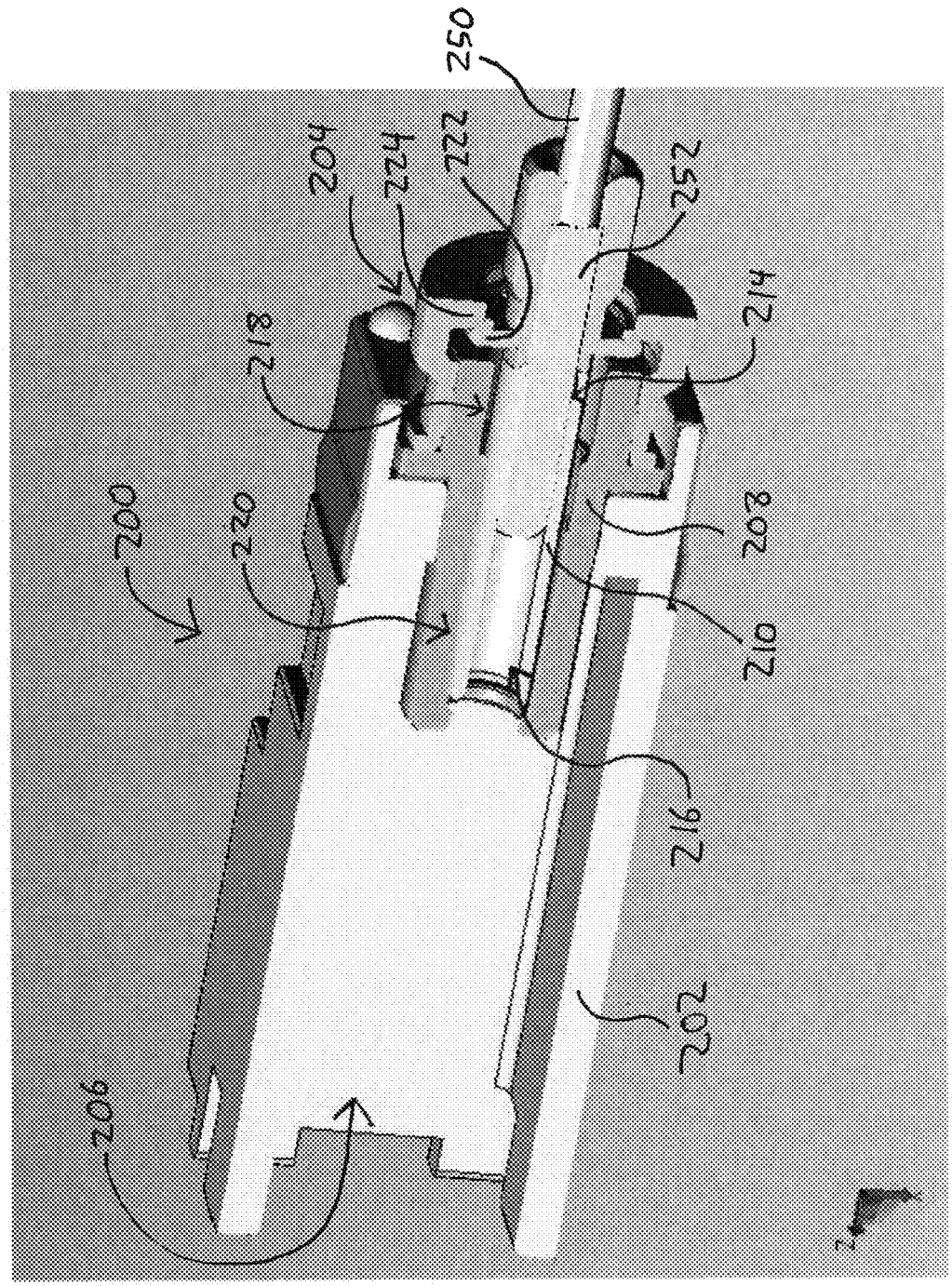
FIG. 2C is another cross-sectional perspective view of the connector of FIG. 2A.

Also disclosed in FIG. 2C, the portion 218 of the shell 208 that surrounds the first end 214 of the split sleeve 210 has a greater inside clearance than the portion 220 of the shell 208 that surrounds the second end 216 of the split sleeve 210. This greater inside clearance of the portion 218 of the shell 208 enables the first end 214 of the split sleeve 210 to shift/float/tilt when a side load is applied to the external optical fiber (not shown) or the fiber optic connector 200 is agitated. In addition, a flange 222 attached to the ferrule 252 of the optical fiber 250, in cooperation with a ring 224, allows the first end 214 of the split sleeve 210 to shift/float/tilt within the portion 218 of the shell 208 while maintaining the first end 214 of the split sleeve 210 in an appropriate z-position with respect to the fiber optic connector 200.

Enabling the first end 214 of the split sleeve 210 to shift/float/tilt during a side load or agitation allows the split sleeve 210 to maintain a stable alignment between the internal optical fiber 250 and the external optical fiber (not shown). This stable alignment contributes to low levels of power change when a side load is applied to the external optical fiber (not shown) or the fiber optic connector 200 is agitated.

Figure 2D:
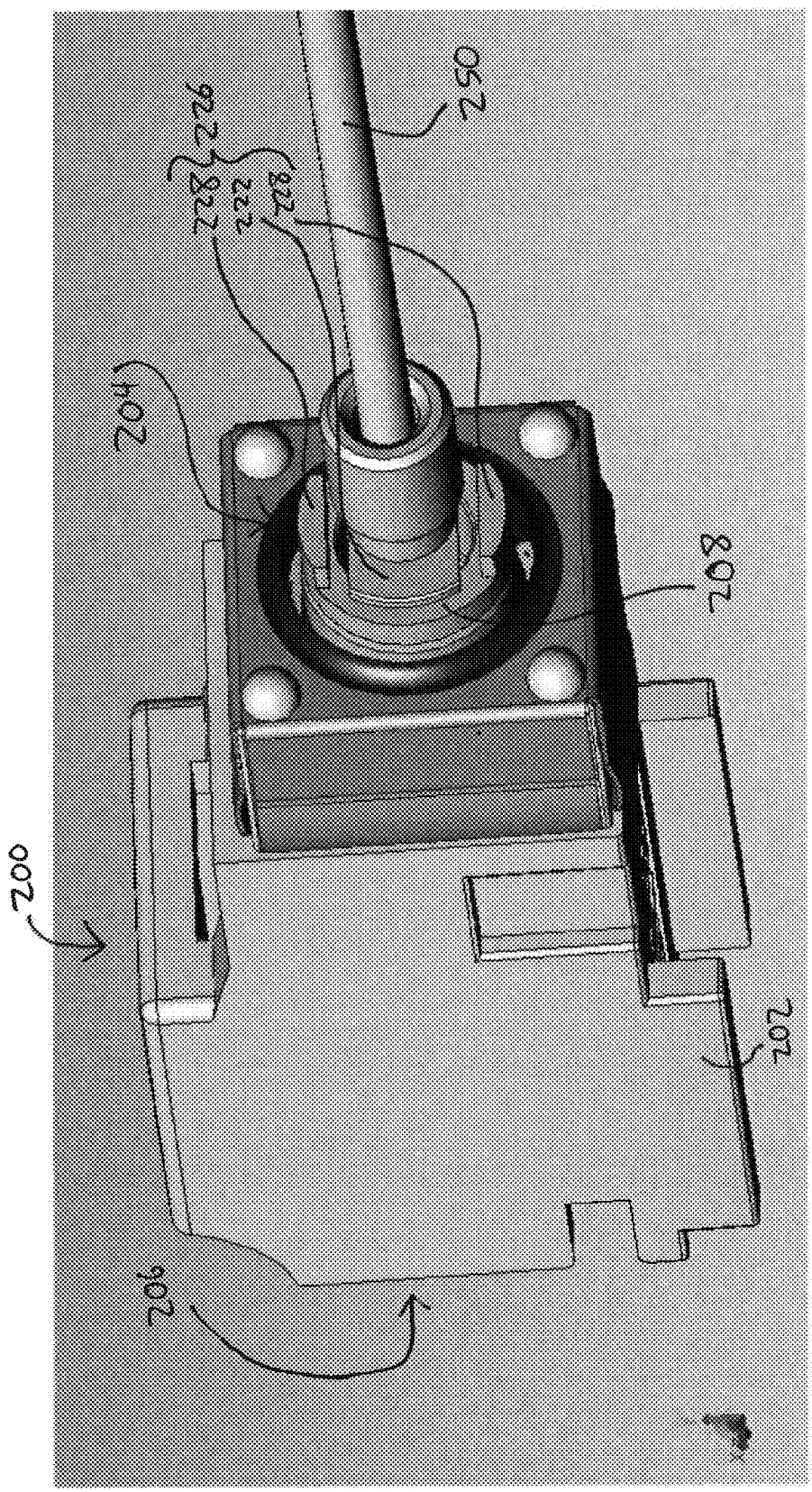
FIG. 2D is a perspective rear view of the connector of FIG. 2A.

As disclosed in FIGS. 2C and 2D, the connector 200 also includes a keyed feature 226. The keyed feature 226 includes the flange 222 and protrusions 228 from the shell 208. Although the ring 224 has been removed from FIG. 2D to expose aspects of the keyed feature 226, it is understood that the ring 224 contributes to the functionality of the keyed feature 226. The keyed feature 226 functions similarly to the keyed feature 126 disclosed herein.

3. Third Example Fiber Optic Connector

Figure 3:
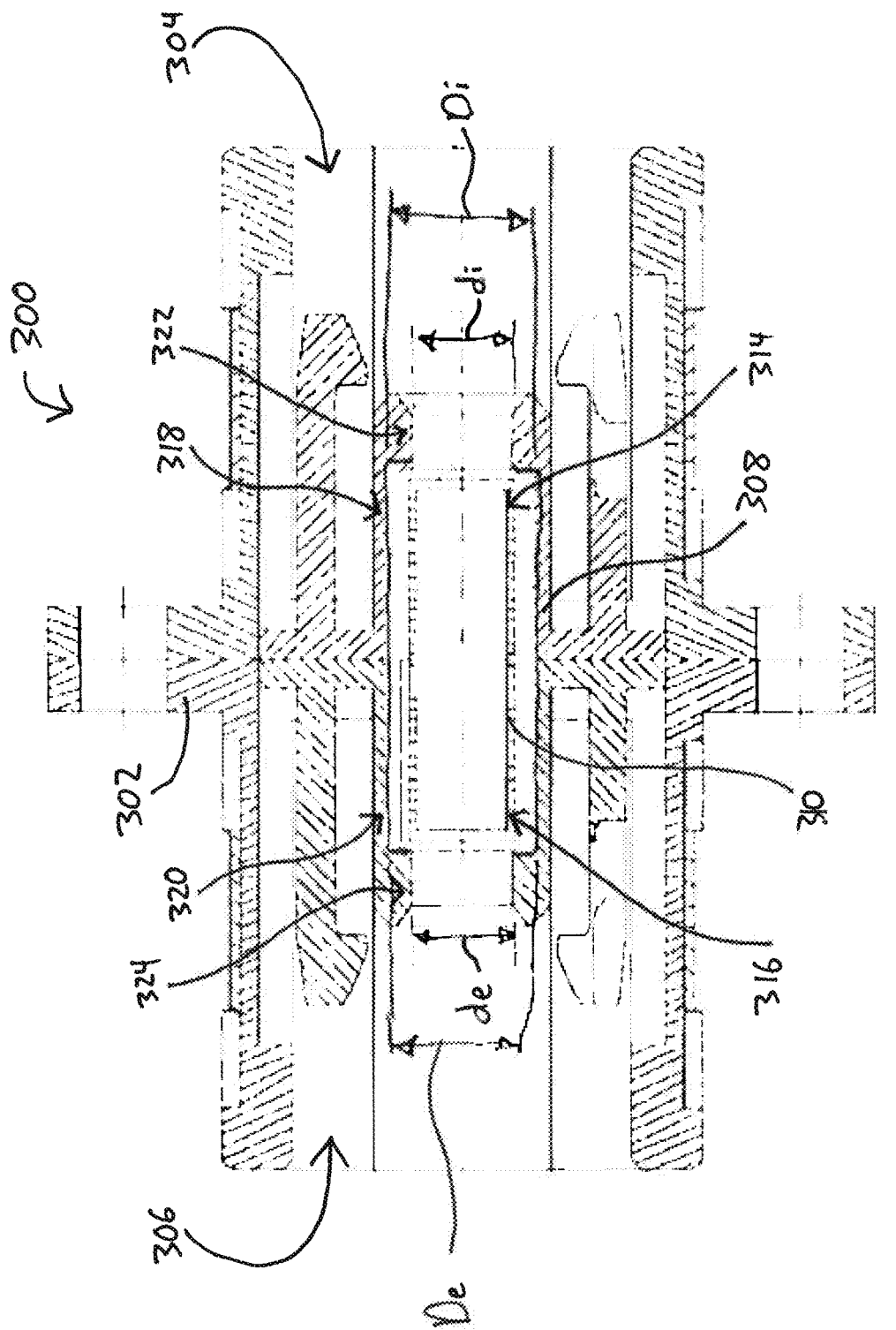
FIG. 3 is a cross-sectional side view of a third example fiber optic connector.

Reference is now made to FIG. 3 which discloses a third example fiber optic connector 300. The connector 300 is an SC connector and is configured to be integrated into an optoelectronic device, such as an optoelectronic transceiver module having any of the characteristics discussed above in connection with FIGS. 1A-1F.

As disclosed in FIG. 3, the connector 300 includes a body 302 which defines an internal port 304 and an external port 306. An internal optical fiber (not shown) can be plugged into the internal port 304 and an external optical fiber (not shown) can be plugged into the external port 306. The connector 300 includes a shell 308 that surrounds a cylindrical split sleeve 310, both of which are at least partially positioned within the body 302. The split sleeve 310 defines a slot (not shown) along the entire length of the split sleeve 310. A first open end 314 and a second open end 316 of the split sleeve 310 are configured to receive and firmly grip ferrules of the internal and external optical fibers (not shown), respectively.

Also disclosed in FIG. 3, the diameter 'Di' of the portion 318 of the shell 308 that surrounds the first end 314 of the split sleeve 310 is greater than the diameter 'De' of the portion 320 of the shell 308 that surrounds the second end 316 of the split sleeve 310. The diameter 'Di' of the portion 318 of the shell 308 may also gradually increase creating a tapered surface. This greater diameter 'Di' of the portion 318 of the shell 308 enables the first end 314 of the split sleeve 310 to shift/float/tilt when a side load is applied to the external optical fiber (not shown) or the connector 300 is agitated. In addition, the diameter 'di' of the portion 322 of the shell 308 to the right of the first end 314 of the split sleeve 310 is greater than the diameter 'de' of the portion 324 of the shell 308 to the left of the second end 316 of the split sleeve 310. It is noted that the diameter 'de' of the portion 324 of the shell 308 is substantially compliant with the FOCIS standard. This greater diameter 'di' of the portion 322 of the shell 308 further enables the first end 314 of the split sleeve 310 to shift/float/tilt when a side load is applied to the external optical fiber (not shown) or the connector 300 is agitated.

Enabling the first end 314 of the split sleeve 310 to shift/float/tilt during a side load or agitation allows the split sleeve 310 to maintain a stable alignment between the internal and external optical fibers (not shown). This stable alignment contributes to low levels of power change when a side load is applied to the external optical fiber (not shown) or the connector 300 is agitated.

4. Fourth Example Fiber Optic Connector

Figure 4:
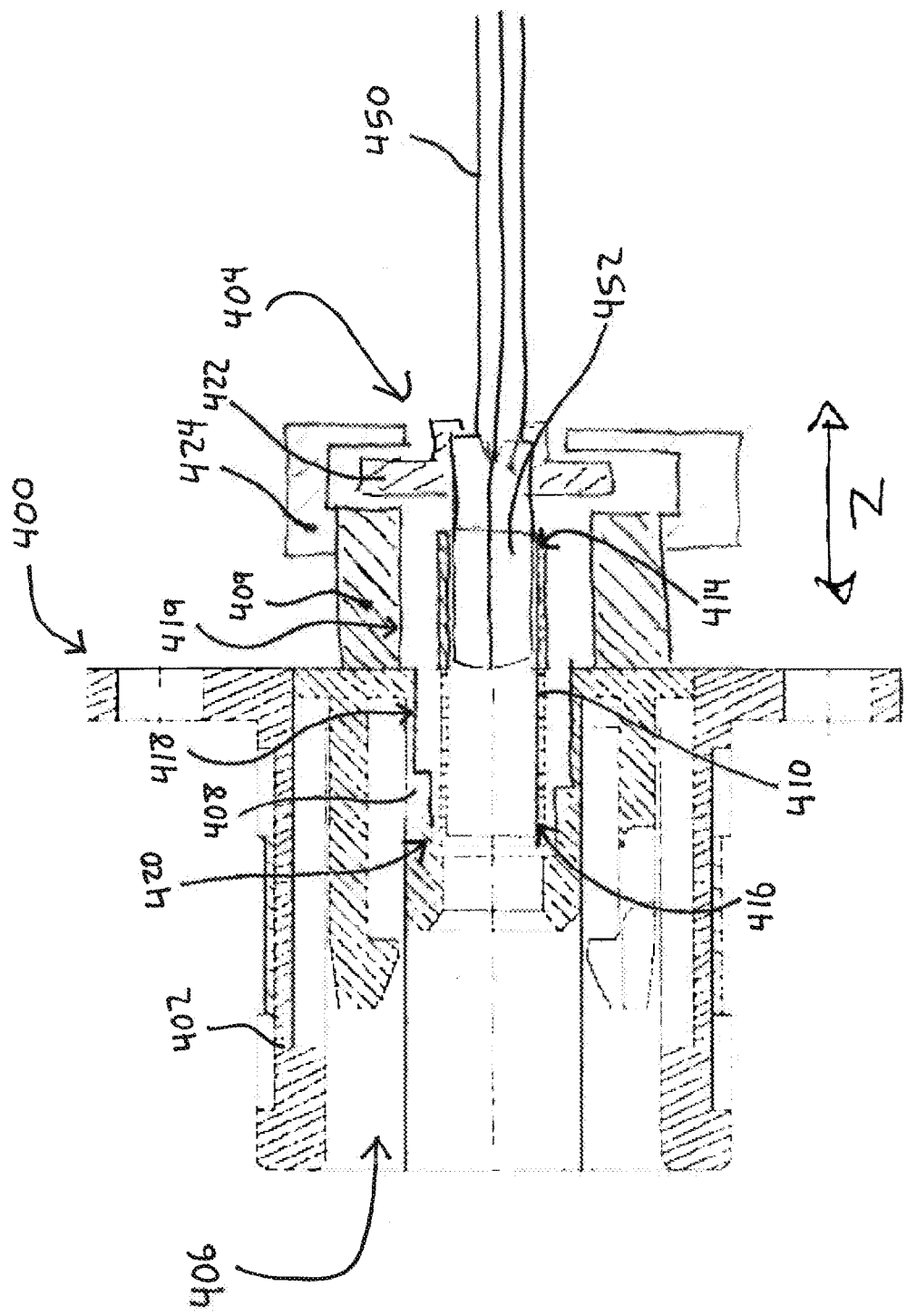
FIG. 4 is a cross-sectional side view of a fourth example fiber optic connector.

Reference is now made to FIG. 4 which discloses a fourth example fiber optic connector 400. The connector 400 is an SC connector and is configured to be integrated into an optoelectronic device, such as an optoelectronic transceiver module having any of the characteristics discussed above in connection with FIGS. 1A-1F.

As disclosed in FIG. 4, the connector 400 includes a body 402 which defines an internal port 404 and an external port 406. The connector 400 also includes first and second shells 408 and 409 which together surround a cylindrical split sleeve 410. The split sleeve 410 defines a slot (not shown) along the entire length of the split sleeve 410. A first open end 414 and a second open end 416 of the split sleeve 410 are configured to receive and firmly grip a ferrule 452 of the internal optical fiber 450 and a ferrule of the external optical fiber (not shown), respectively.

Also disclosed in FIG. 4, the stepped portions 418 and 419 of the shells 408 and 409 that surround the first end 414 of the split sleeve 410 have greater inside clearance than the portion 420 of the shell 408 that surrounds the second end 416 of the split sleeve 410. The greater inside clearance in the portions 418 and 419 of the shells 408 and 409 enable the first end 414 of the split sleeve 410 to shift/float/tilt when a side load is applied to the external optical fiber (not shown) or the connector 400 is agitated. In addition, a flange 422 attached to the ferrule 452 of the optical fiber 450, in cooperation with a ring 424, allow the first end 414 of the split sleeve 410 to shift/float/tilt within the portion 418 and 419 of the shells 408 and 409 while maintaining the first end 414 of the split sleeve 410 in the proper z-position within the fiber optic connector 400.

Enabling the first end 414 of the split sleeve 410 to shift/float/tilt during a side load or agitation allows the split sleeve 410 to maintain a stable alignment between the internal optical fiber 450 and the external optical fiber (not shown). This stable alignment contributes to low levels of power change when a side load is applied to the external optical fiber (not shown) or the connector 400 is agitated.

5. Fifth Example Fiber Optic Connector

Figure 5:
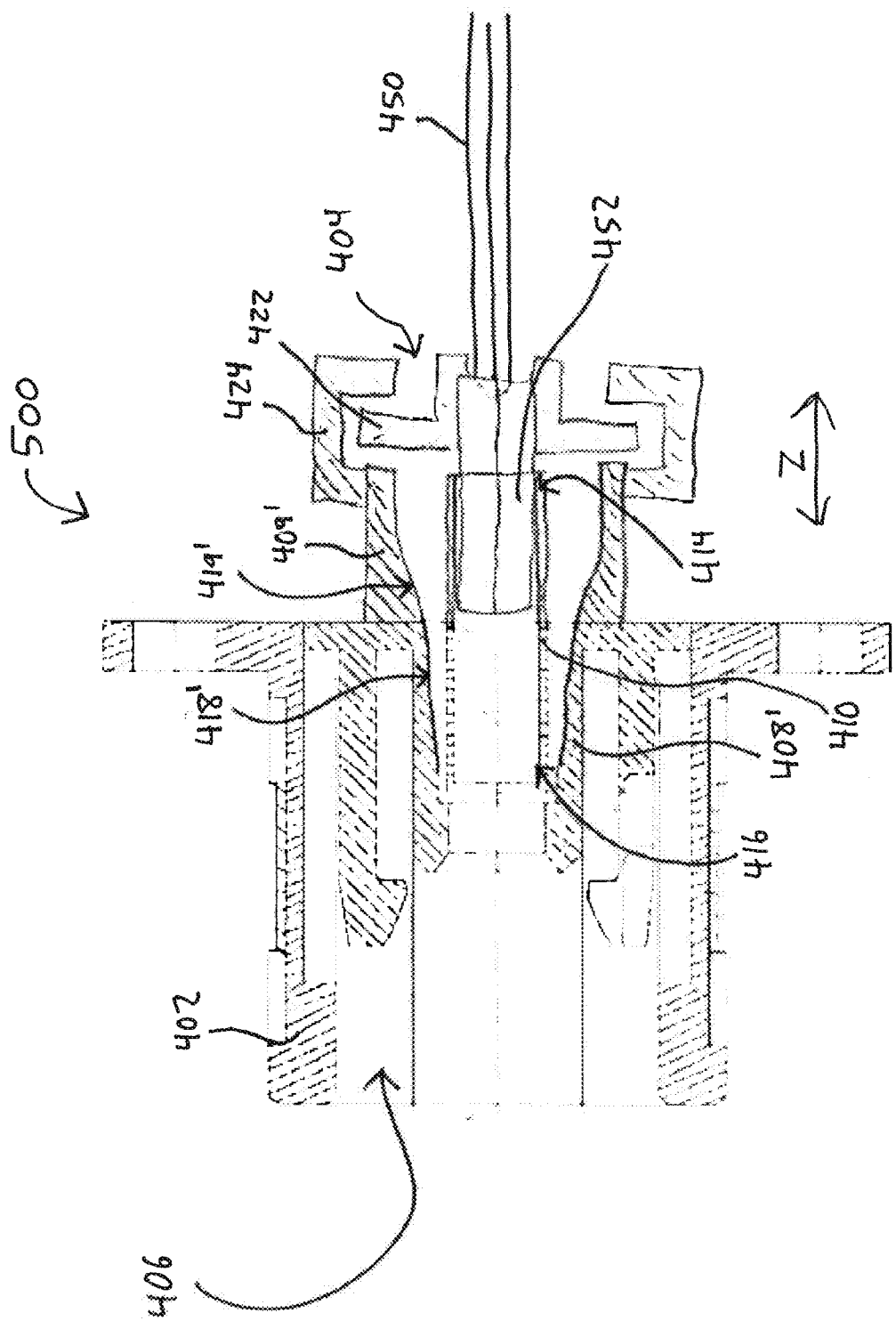
FIG. 5 is a cross-sectional side view of a fifth example fiber optic connector.

Reference is now made to FIG. 5 which discloses a fifth example fiber optic connector 500. The connector 500 is identical to the connector 400 except that the stepped portions 418 and 419 of the connector 400 are replaced with tapered portions 418' and 419' in the connector 500. The increased inside clearance in the portions 418' and 419' enable the first end 414 of the split sleeve 410 to shift/float/tilt when a side load is applied to the external optical fiber (not shown) or the connector 400 is agitated. Enabling the first end 414 of the split sleeve 410 to shift/float/tilt during a side load or agitation allows the split sleeve 410 to maintain a stable alignment between the internal optical fiber 450 and the external optical fiber (not shown). This stable alignment contributes to low levels of power change when a side load is applied to the external optical fiber (not shown) or the example fiber optic connector 400 is agitated.

6. Sixth Example Fiber Optic Connector

Reference is now made to FIG. 6 which discloses a portion of a sixth example fiber optic connector 600. Although not shown in FIG. 6, the left side of the connector 600 is similar to the left side of the connector 400. The connector 600 is configured to be integrated into an optoelectronic device, such as an optoelectronic transceiver module having any of the characteristics discussed above in connection with FIGS. 1A-1F.

As disclosed in FIG. 6, the connector 600 includes a shell 608 which at least partially surrounds a cylindrical split sleeve 610. The split sleeve 610 defines a slot (not shown) along the entire length of the split sleeve 610. A first open end 614 and a second open end 616 of the split sleeve 610 are configured to receive and firmly grip a ferrule 652 of the internal optical fiber 650 and a ferrule of the external optical fiber (not shown), respectively.

Also disclosed in FIG. 6, a portion 618 of the shell 608 that surround the first end 614 of the split sleeve 610 has a greater inside clearance than other portions of the shell 608. The greater inside clearance in the portion 618 of the shell 608 enables the first end 614 of the split sleeve 610 to shift/float/tilt when a side load is applied to the external optical fiber (not shown) or the example fiber optic connector 600 is agitated.

In addition, a flange 622 attached to the ferrule 652 of the optical fiber 650 is spring loaded. In particular, prior to the insertion of the ferrule of the external optical fiber (not shown) into the second end 616 of the split sleeve 610, spring forces 624 and 626 and/or spring forces 628 and 630 tend to bias the flange 622 against the shell 608. During insertion of the ferrule of the external optical fiber (not shown) into the second end 616 of the split sleeve 610, the ferrule of the external optical fiber biases against the ferrule 652 of the internal optical fiber 650, thus overcoming the spring forces 624 and 626 and/or spring forces 628 and 630 so as to place the flange 622 in the proper z-position. The spring forces 624 and 626 and/or 628 and 630 can help maintain the flange 622 in the proper z-position without allowing the flange 622 to rub against other components of the connector 600. It is understood that either the flange 622 may be configured with either the spring forces 624 and 626 or spring forces 628 and 630, or both. It is further understood that the ferrule of the external optical fiber (not shown) may be similarly spring loaded.

Enabling the first end 614 of the split sleeve 610 to shift/float/tilt during a side load or agitation allows the split sleeve 610 to maintain a stable alignment between the internal optical fiber 650 and the external optical fiber (not shown). This stable alignment contributes to low levels of power change when a side load is applied to the external optical fiber (not shown) or the connector 600 is agitated.

7. Seventh Example Fiber Optic Connector

Reference is now made to FIGS. 7A-7D which discloses a seventh example fiber optic connector 700. Although not shown in FIG. 7A, the left side of the connector 700 is similar to the left side of the connector 400. The connector 700 is configured to be integrated into an optoelectronic device, such as an optoelectronic transceiver module having any of the characteristics discussed above in connection with FIGS. 1A-1F.

Figure 7A:
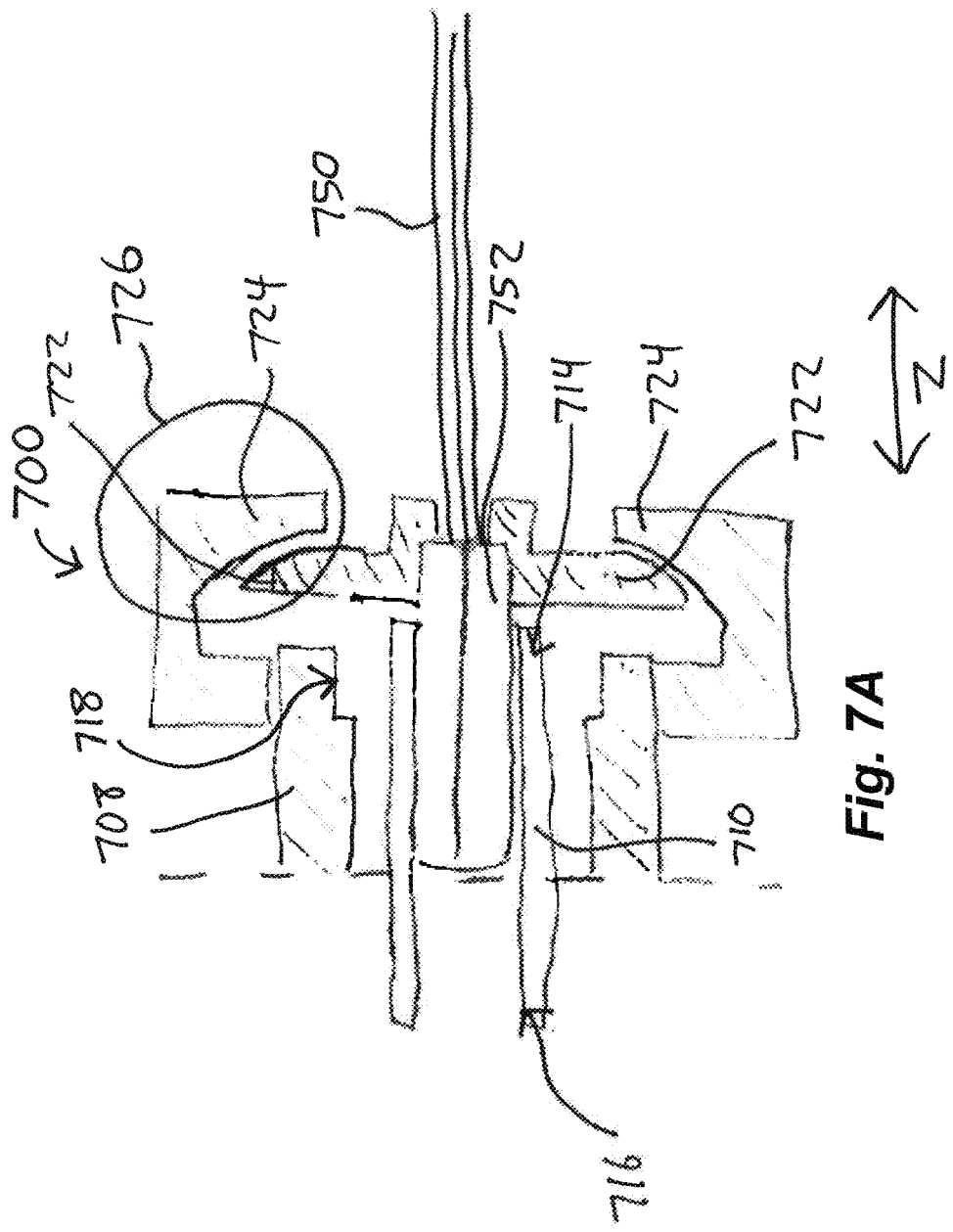
FIG. 7A is a cross-sectional side view of a portion of a seventh example fiber optic connector.

As disclosed in FIG. 7A, the connector 700 includes a shell 708 which at least partially surrounds a cylindrical split sleeve 710. The split sleeve 710 defines a slot (not shown) along the entire length of the split sleeve 710. A first open end 714 and a second open end 716 of the split sleeve 710 are configured to receive and firmly grip a ferrule 752 of the internal optical fiber 750 and a ferrule of the external optical fiber (not shown), respectively.

Also disclosed in FIG. 7A, the portion 718 of the shell 708 that surrounds the first end 714 of the split sleeve 710 has greater inside clearance than other portions of the shell 708. The greater inside clearance in the portion 718 of the shell 708 enables the first end 714 of the split sleeve 710 to shift/float/tilt when a side load is applied to the external optical fiber (not shown) or the connector 700 is agitated. In addition, a rounded flange 722 attached to the ferrule 752 of the optical fiber 750, in cooperation with a rounded ring 724, allow the first end 714 of the split sleeve 710 to shift/float/tilt within the portion 718 of the shell 708 while maintaining the first end 714 of the split sleeve 710 in the proper z-position within the fiber optic connector 700.

Enabling the first end 714 of the split sleeve 710 to shift/float/tilt during a side load or agitation allows the split sleeve 710 to maintain a stable alignment between the internal optical fiber 750 and the external optical fiber (not shown). This stable alignment contributes to low levels of power change when a side load is applied to the external optical fiber (not shown) or the connector 700 is agitated.

FIGS. 7B-7D show three variations on the circled portion 726 of FIG. 7A. FIG. 7B shows the rounded flange 722 and an angled ring 724'. FIG. 7C shows an angled flange 722' and the angled ring 724'. FIG. 7D shows the rounded flange 722 and a straight edged ring 724". These variations on the flange 722 and the ring 724 can each allow the first end 714 of the split sleeve 710 to shift/float/tilt within the portion 718 of the shell 708 while maintaining the first end 714 of the split sleeve 710 in the proper z-position within the fiber optic connector 700 (see FIG. 7A).

8. Eighth Example Fiber Optic Connector

Figure 8:
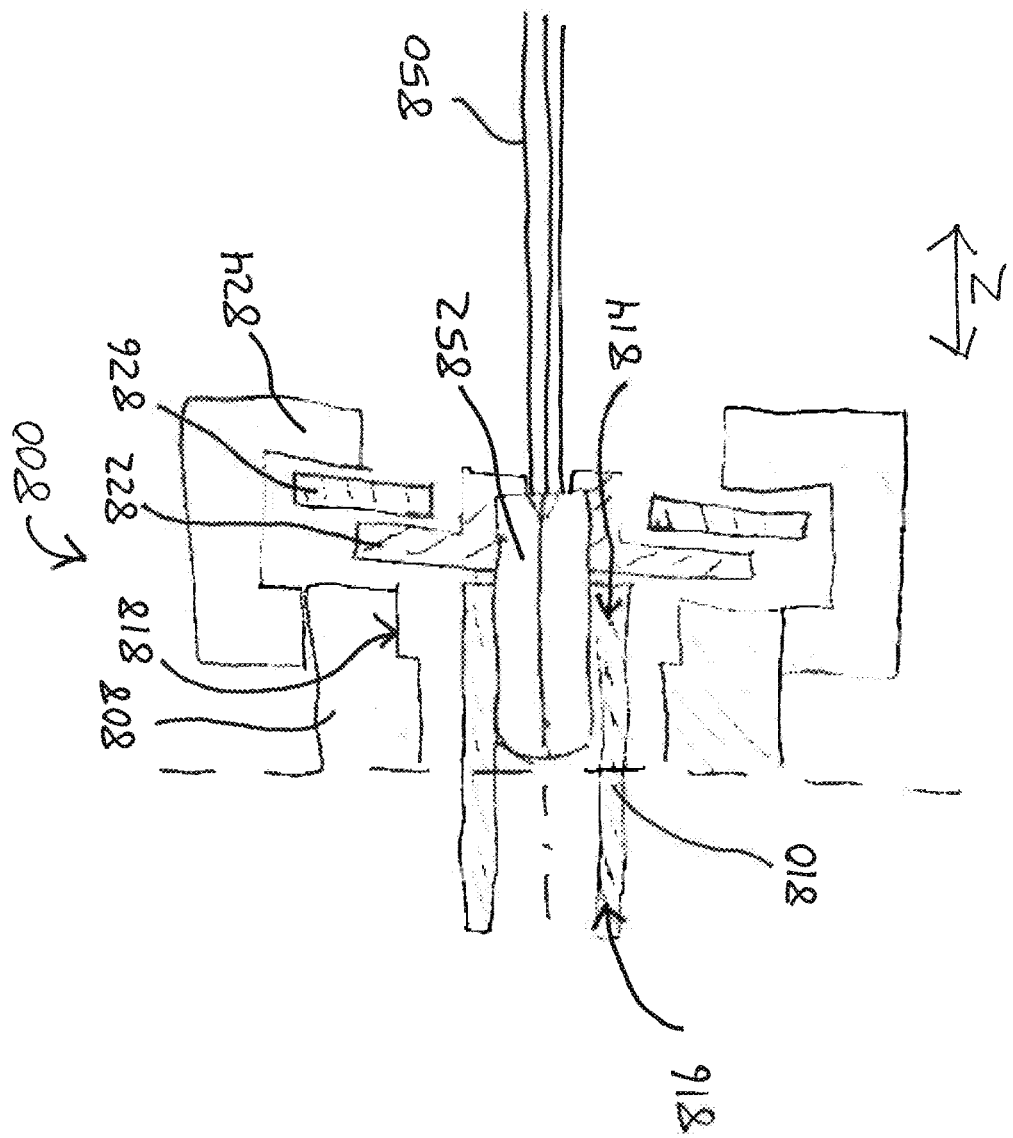
FIG. 8 is a cross-sectional side view of a portion of an eighth example fiber optic connector.

Reference is now made to FIG. 8 which discloses an eighth example fiber optic connector 800. Although not shown in FIG. 8, the left side of the connector 800 is similar to the left side of the connector 400. The connector 800 is configured to be integrated into an optoelectronic device, such as an optoelectronic transceiver module having any of the characteristics discussed above in connection with FIGS. 1A-1F.

As disclosed in FIG. 8, the connector 800 includes a shell 808 which surrounds a cylindrical split sleeve 810. The split sleeve 810 defines a slot (not shown) along the entire length of the split sleeve 810. A first open end 814 and a second open end 816 of the split sleeve 810 are configured to receive and firmly grip a ferrule 852 of the internal optical fiber 850 and a ferrule of the external optical fiber (not shown), respectively.

Also disclosed in FIG. 8, the portion 818 of the shell 808 that surround the first end 814 of the split sleeve 810 have greater inside clearance than other portions of the shell 808. The greater inside clearance in the portion 818 of the shell 808 enables the first end 814 of the split sleeve 810 to shift/float/tilt when a side load is applied to the external optical fiber (not shown) or the connector 800 is agitated. In addition, a flange 822 attached to the ferrule 852 of the optical fiber 850, together with a ring 824, allow the first end 814 of the split sleeve 810 to shift/float/tilt within the portion 818 of the shell 808 while maintaining the first end 814 of the split sleeve 810 in the proper z-position within the fiber optic connector 800.

Further, the connector 800 includes a washer 826. During a side load on the external optical fiber (not shown) or the connector 800 is agitated, the flange 822 tilts on the washer 826 with one side of the flange 822 digging into the washer 826 and creating higher friction. At the same time, the washer 826 is able to glide with low friction against the ring 824 even with the flange 822 being tilted. Thus, the washer 826 is configured to reduce the friction between the flange 822 and the ring 824. The washer 826 and the flange 822 can have various shapes, as discussed above in connection with FIG. 7A-7D.

Enabling the first end 814 of the split sleeve 810 to shift/float/tilt during a side load or agitation allows the split sleeve 810 to maintain a stable alignment between the internal optical fiber 850 and the external optical fiber (not shown). This stable alignment contributes to low levels of power change when a side load is applied to the external optical fiber (not shown) or the connector 800 is agitated.

Although each slot defined by each split sleeve disclosed herein is generally perpendicular to the ends of the split sleeve, it is understood that at least a portion of one or more of the slots disclosed herein may instead run at some other angle with respect to the ends of the split sleeve. Further, although the example fiber optic connectors disclosed herein are SC or LC connections, it is understood that aspects of the example fiber optic connectors disclosed herein can also be employed in other types of fiber optic connectors including, but not limited to, FC, MU, ST, FDDI, ESCON, E2000, MT-RJ, SMA 905/906, and D4 fiber optic connectors.

The example embodiments disclosed herein may be embodied in other specific forms. The example embodiments disclosed herein are to be considered in all respects only as illustrative and not restrictive.

What is claimed is:
1. A fiber optic connector comprising:
a body defining an internal port and an external port;
a cylindrical split sleeve at least partially positioned within the body, the split sleeve defining a slot along the length of the split sleeve, the split sleeve having first and second open ends, the first end configured to receive and grip a ferrule of an internal optical fiber, the second end configured to receive and grip a ferrule of an external optical fiber; and
a shell at least partially positioned within the body and immediately surrounding the split sleeve such that the shell is capable of coming in direct contact with the split sleeve, the portion of the shell immediately surrounding the first end having a greater inside clearance than the portion of the shell immediately surrounding the second end.

2. The fiber optic connector as recited in claim 1, further comprising:
a flange attached to the ferrule of the internal optical fiber; and
a ring at least partially surrounding the flange, the ring and the flange cooperating to maintain the first end of the split sleeve in a particular z-position within the fiber optic connector.

3. The fiber optic connector as recited in claim 2, further comprising one or more protrusions from the shell that are configured to interact with the flange attached to the ferrule of the internal optical fiber to prevent the rotation of the ferrule of the internal optical fiber.

4. The fiber optic connector as recited in claim 3, wherein the one or more protrusions comprise one or more pins that interact with a slot defined in the flange attached to the ferrule of the internal optical fiber.

5. The fiber optic connector as recited in claim 2, wherein the flange attached to the ferrule of the internal optical fiber is spring loaded such that spring forces tend to bias the flange toward the shell.

6. The fiber optic connector as recited in claim 5, wherein a flange attached to the ferrule of the external optical fiber is spring loaded such that spring forces tend to bias the flange attached to the ferrule of the external optical fiber toward the shell.

7. The fiber optic connector as recited in claim 2, wherein a surface of the flange is rounded.

8. The fiber optic connector as recited in claim 7, wherein a surface of the ring facing the rounded surface of the flange is also rounded.

9. The fiber optic connector as recited in claim 7, wherein a surface the ring facing the rounded surface of the flange is angled.

10. The fiber optic connector as recited in claim 2, wherein a surface the flange is angled and a surface the ring facing the angled surface of the flange is also angled.

11. The fiber optic connector as recited in claim 2, further comprising a washer positioned between the flange and the ring and surrounding the ferrule of the internal optical fiber, wherein the washer is configured to reduce the friction between the flange and the ring.

12. The fiber optic connector as recited in claim 1, wherein the slot is not perpendicular to the first and second ends of the split sleeve along at least a portion of the length of the split sleeve.

13. The fiber optic connector as recited in claim 1, wherein the fiber optic connector is one of an SC, LC, MU, ST, FDDI, ESCON, E2000, MT-RJ, SMA 905/906, or D4 connector.

14. The fiber optic connector as recited in claim 1, wherein the inside clearance of the portion of the shell surrounding the first end gradually increases to create a tapered surface.

15. The fiber optic connector as recited in claim 1, wherein:
a diameter of a portion of the shell next to but not surrounding the first end is greater than a diameter of a portion of the shell next to but not surrounding the second end; and
the diameter of the portion of the shell next to but not surrounding the second end is substantially compliant with the FOCIS standard.

16. An optoelectronic transceiver module having a form factor that is substantially compliant with the CFP MSA and that includes one or more fiber optic connectors as recited in claim 1 integrated therein.

17. A fiber optic connector comprising:

a body defining an internal port and an external port;

a cylindrical split sleeve at least partially positioned within the body, the split sleeve defining a slot along the length of the cylindrical split sleeve, the split sleeve having first and second open ends, the first end configured to receive and grip a ferrule of an internal optical fiber, the second end configured to receive and grip a ferrule of an external optical fiber; and two or more shells at least partially positioned within the body and immediately surrounding the split sleeve such that at least one of the two or more shells is capable of coming in direct contact with the split sleeve, the portion of the two or more shells immediately surrounding the first end having a greater inside clearance than the portion of the two or more shells immediately surrounding the second end.

18. The fiber optic connector as recited in claim 17, wherein the two or more shells include stepped surfaces each of which has greater inside clearance than the portion of the two or more shells that surrounds the second end.

19. The fiber optic connector as recited in claim 17, wherein the two or more shells include tapered surfaces each of which has greater inside clearance than the portion of the two or more shells that surrounds the second end.

20. An optoelectronic transceiver module having a form factor that is substantially compliant with the CFP MSA and that includes one or more fiber optic connectors as recited in claim 17 integrated therein.

* * * * *